(12) United States Patent
Lee et al.

(10) Patent No.: US 8,870,191 B2
(45) Date of Patent: Oct. 28, 2014

(54) ACTIVE ROLL CONTROL SYSTEM

(75) Inventors: Un Koo Lee, Seoul (KR); Sung Bae Jang, Suwon-si (KR); Pil Young Jeong, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/561,733

(22) Filed: Jul. 30, 2012

(65) Prior Publication Data

US 2013/0147141 A1   Jun. 13, 2013

(30) Foreign Application Priority Data

Dec. 9, 2011   (KR) .......................... 10-2011-0132275

(51) Int. Cl.
*B60G 21/00* (2006.01)

(52) U.S. Cl.
USPC .................. 280/5.507; 280/5.508; 280/5.511; 280/124.106; 267/188

(58) Field of Classification Search
USPC .............. 280/5.5, 5.502, 5.506, 5.507, 5.508, 280/5.511, 124.106, 124.107, 124.146; 267/188
See application file for complete search history.

(56) References Cited

U.S. PATENT DOCUMENTS

| | | | |
|---|---|---|---|
| 4,892,329 A | 1/1990 | Kozaki et al. | |
| 5,186,486 A * | 2/1993 | Hynds et al. | 280/124.107 |
| 6,175,792 B1 | 1/2001 | Jones et al. | |
| 6,254,114 B1 | 7/2001 | Pulling et al. | |
| 7,325,820 B2 * | 2/2008 | Allen et al. | 280/124.15 |
| 7,377,529 B2 * | 5/2008 | Green | 280/124.107 |
| 7,427,073 B2 * | 9/2008 | Won | 280/5.507 |
| 7,766,344 B2 * | 8/2010 | Buma | 280/5.511 |
| 8,302,973 B2 * | 11/2012 | Lee et al. | 280/5.52 |
| 8,398,092 B2 * | 3/2013 | Lee et al. | 280/5.507 |
| 8,408,559 B1 * | 4/2013 | Lee et al. | 280/5.508 |
| 8,540,251 B2 * | 9/2013 | Lee et al. | 280/5.508 |
| 2001/0054801 A1 * | 12/2001 | Perello et al. | 280/5.52 |
| 2009/0288297 A1 | 11/2009 | Schmidt et al. | |
| 2010/0266376 A1 * | 10/2010 | Bannon et al. | 414/477 |
| 2012/0049480 A1 * | 3/2012 | Lee et al. | 280/124.106 |
| 2012/0306177 A1 | 12/2012 | Thill | |
| 2013/0147135 A1 * | 6/2013 | Lee et al. | 280/5.508 |
| 2013/0147136 A1 * | 6/2013 | Lee et al. | 280/5.508 |

FOREIGN PATENT DOCUMENTS

| | | |
|---|---|---|
| JP | 5-5557 U | 1/1993 |
| JP | 5-213040 A | 8/1993 |
| JP | 10-297312 A | 11/1998 |
| JP | 2001-520602 A | 10/2001 |

(Continued)

*Primary Examiner* — Paul N Dickson
*Assistant Examiner* — Barry Gooden, Jr.
(74) *Attorney, Agent, or Firm* — Morgan, Lewis & Bockius LLP

(57) ABSTRACT

An active roll control device utilizes driving torque to move a suspension arm side connection point of a stabilizer link connecting both sides of a stabilizer bar with a suspension arm along a sliding unit to actively control vehicle roll. The sliding unit may include slide rails, a load surface on an upper surface and a lower surface, and a guide surface on an inner side surface, a connector is connected to a pushrod of a drive shaft of the operating source and a lower end portion of the stabilizer link through a double ball joint, a plurality of load rollers rotatably disposed on an upper surface and a lower surface of the connector through a roller pin and contacts the load surface of the sliding rail, and guide rollers rotatably on the connector through a roller pin and contacts the guide surface of the sliding rail.

5 Claims, 4 Drawing Sheets

(56) References Cited

FOREIGN PATENT DOCUMENTS

| | | |
|---|---|---|
| JP | 2002-114064 A | 4/2002 |
| JP | 2007-182229 A | 7/2007 |
| JP | 4095277 B2 | 3/2008 |
| JP | 2010-042798 A | 2/2010 |
| KR | 1998-045430 A | 9/1998 |
| KR | 10-0629799 B1 | 9/2006 |
| KR | 10-0665320 B1 | 12/2006 |
| KR | 10-2007-0104051 A | 10/2007 |
| KR | 10-2009-0061989 A | 6/2009 |
| KR | 10-2009-0098039 A | 9/2009 |
| KR | 10-0980879 B1 | 9/2010 |

* cited by examiner

ACTIVE ROLL CONTROL SYSTEM

CROSS-REFERENCE TO RELATED APPLICATION

The present application claims priority of Korean Patent Application Number 10-2011-0132275 filed Dec. 9, 2011, the entire contents of which application is incorporated herein for all purposes by this reference.

BACKGROUND OF INVENTION

1. Field of Invention

The present invention relates to an active roll control device of a vehicle. More particularly, the present invention relates to an active roll control device (ARCS: Active Roll Control System) that actively controls roll of a stabilizer bar that is disposed at both suspension arms through a stabilizer link.

2. Description of Related Art

Generally, a suspension system of a vehicle connects an axle with a vehicle body, and prevents vibration or impact that is transferred from the road from being transferred to the vehicle body while driving to enhance ride comfort.

The suspension system includes a chassis spring that reduces impact transferred from road, a shock absorber that damps a free vibration of the chassis spring to improve ride comfort, and a stabilizer bar that reduces roll of a vehicle.

The stabilizer bar is fixed on a vehicle body and both end portions thereof respectively is fixed to a lower arm or a strut bar through a stabilizer link.

Accordingly, the stabilizer bar is not operated while left/right wheel is equally moved up/down and reduces the roll of a vehicle body through a torsion elastic force while left/right wheel are differently moved up/down.

FIG. 1 is a partial perspective view of a suspension system for a vehicle that uses an active roll control device according to a conventional art.

Referring to FIG. 1, an active roll control device of a conventional art improves a roll characteristic of a vehicle by varying a rigidity of a stabilizer bar 1 according to a driving condition of a vehicle.

The active roll control device includes a stabilizer bar 1, a stabilizer link 3, a sliding unit 5 that is disposed on a lower arm 7 as a suspension arm, and a driving unit 6.

The stabilizer bar 1 is mounted on a bracket 13 of a sub frame 11 in a vehicle body side through a mounting bush 15.

And, one end of the stabilizer link 3 is connected to one end of the stabilizer bar 1 through a ball joint (BJ).

Meanwhile, an outer end portion of the lower arm 7 is connected to a lower side of a knuckle 17 and includes a housing portion 21 to form the sliding unit 5.

The sliding unit 5 includes a slide rail 23 at both sides of the inside of the housing portion 21 on the lower arm 7 in a vehicle width direction and a connector 25 that is connected to a lower end of the stabilizer link 3 is disposed between the slide rail 23 to be guided in a vehicle width direction.

The drive source 6 includes a motor 19 having a drive shaft 27 that is operated in both directions and is disposed at one side of the sub frame 11, and the drive shaft 27 is connected to the connector 25 through a push rod 29 to draw or push the connector 25.

The conventional active roll control device that is configured as described above adjusts a connection position of the stabilizer link 3 on the lower arm 7 through the operation of the motor 19 according to the driving condition of the vehicle and actively controls the lever ratio of the stabilizer link 3 to adjust the roll rigidity and the turning stability of the vehicle.

Meanwhile, because the above active roll control device is disposed in a narrow space that is formed at a lower portion of a vehicle body, the system is to be compact, but a friction resistance of the sliding unit is a factor that deteriorates the down size of the drive source 6.

For this, recently there is a demand for minimizing the friction resistance between the connector 25 and the slide rail 23 of the sliding unit 5 such that a power delivery efficiency of the motor 19 as a drive source is improved to enable the down-size.

The above information disclosed in this Background section is only for enhancement of understanding of the background of the invention and therefore it may contain information that does not form the prior art that is already known in this country to a person of ordinary skill in the art.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an active roll control device having advantages of disposing a roller, of which a rated load is large for the contacting surface, at an upper side and a lower side respectively in a slide rail to minimize a friction resistance that is generated by a vertical load and a moment load that is applied to a sliding unit.

An active roll control device that uses a driving torque that is transferred from a drive source to move a suspension arm side connection point of a stabilizer link that connects both sides of a stabilizer bar with a suspension arm along a sliding unit such that the roll of a vehicle is actively controlled, wherein the sliding unit may include a slide rail that is disposed at both sides along a vehicle with direction in a housing portion that is formed on an upper side of the suspension arm, a load surface is formed at an upper surface and a lower surface, and a guide surface is formed at an inner side surface, a connector that is disposed in the housing portion corresponding to the side rail and is connected to an end portion of a pushrod of a drive shaft of the operating source and a lower end portion of the stabilizer link through a double ball joint, a plurality of load rollers that is rotatably disposed on an upper surface and a lower surface of the connector along the moving direction through a roller pin and contacts the load surface of the sliding rail, and a plurality of guide rollers that is rotatably disposed on a front/rear side surface of the connector through a roller pin and contacts the guide surface of the sliding rail.

An upper side surface and a lower side surface of the load surface may be respectively perpendicular to the guide surface.

A first mounting groove that the load roller is disposed therein may be formed at an upper surface and a lower surface of the connector corresponding to the upper side surface and the lower side surface of the slide rail along the length direction.

A second mounting groove that the guide roller is disposed therein may be formed at a front/rear surface of the connector corresponding to the guide surface of the slide rail.

The suspension arm may be a lower arm that connects a knuckle with a sub frame.

Various aspects of the present invention applies the roller to the connector that is disposed at a lower portion of the suspension arm and adjusts the connection position of the stabilizer link on the suspension arm according to the driving condition of the vehicle to actively control the roll rigidity of the vehicle such that the turning stability of the vehicle is improved.

Also, the roller of which the rated load for the contacting surface is large is disposed at an upper side and a lower side in the slide rail to minimize the friction resistance that is generated by the vertical load and the moment load that is applied to the sliding unit.

Thereby, the power delivery efficiency of the motor is improved to be able to down size the system.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
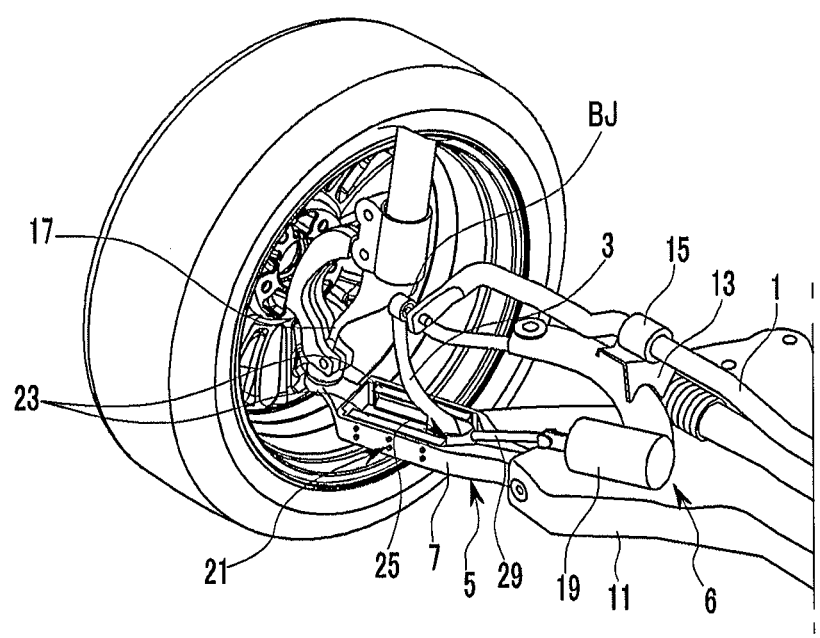
FIG. 1 is a partial perspective view of a suspension system for a vehicle that a conventional active roll control device is applied thereto.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The drawings and description are to be regarded as illustrative in nature and not restrictive. Like reference numerals designate like elements throughout the specification.

Figure 2:
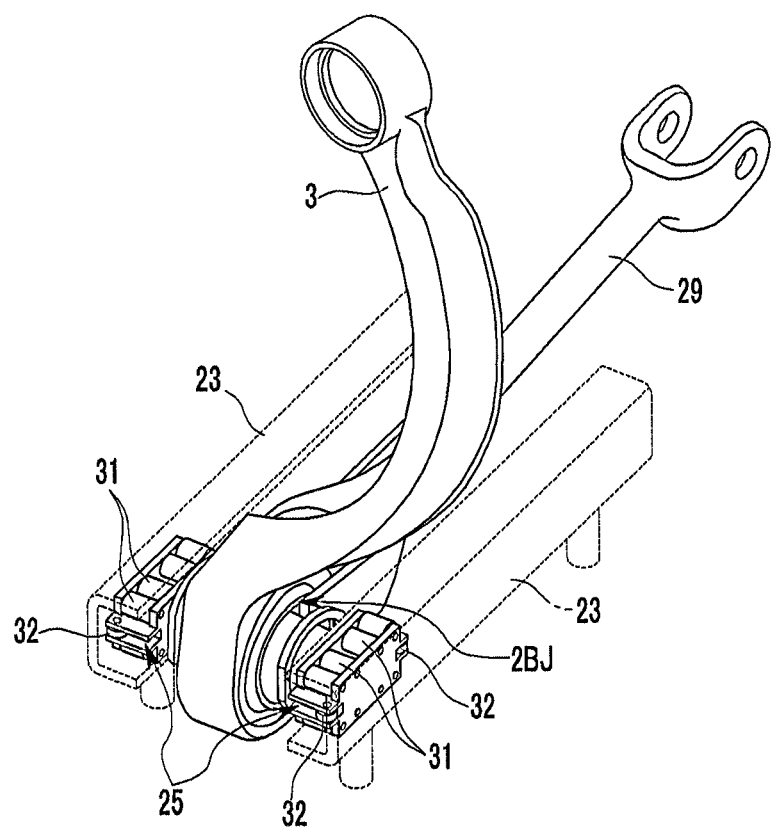
FIG. 2 is a partially transparent perspective view of a sliding unit of an exemplary active roll control device according to the present invention.
Figure 3:
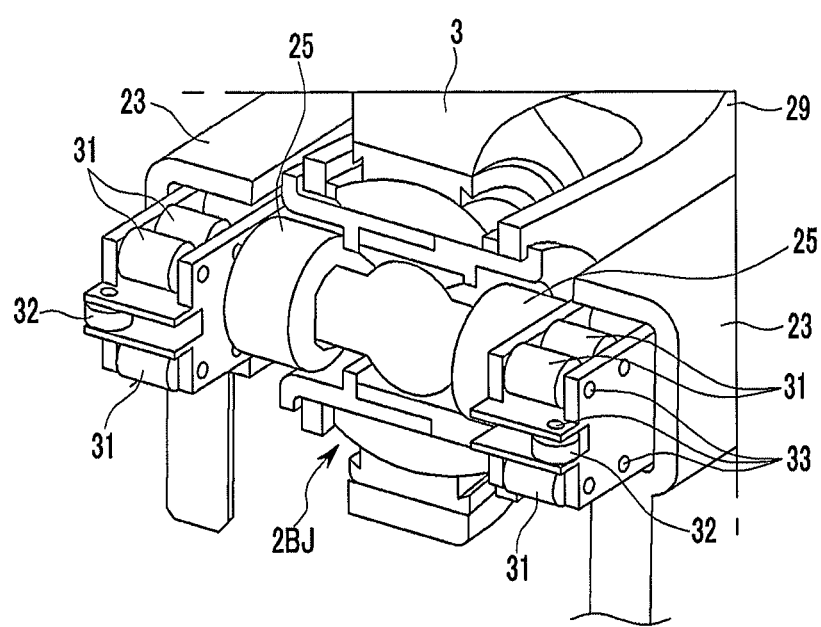
FIG. 3 is a partially cut-away perspective view of a sliding unit of an exemplary active roll control device according to the present invention.
Figure 4:
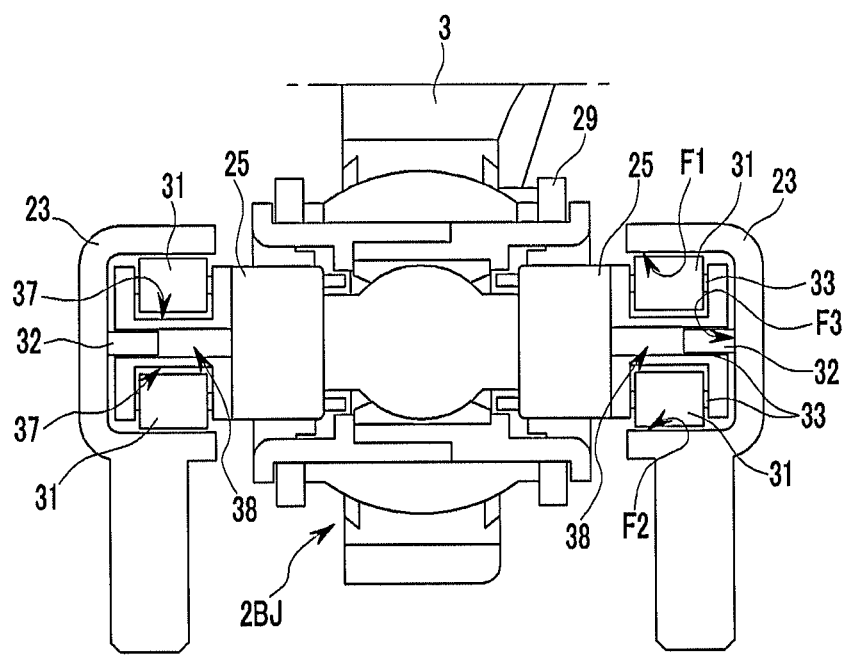
FIG. 4 is a cross-sectional view of a sliding unit of an exemplary active roll control device according to the present invention.

FIG. 2 is a partially transparent perspective view of a sliding unit that an active roll control device according to various embodiments of the present invention, FIG. 3 is a partially cut-away perspective view of a sliding unit that an active roll control device according to various embodiments of the present invention, and FIG. 4 is a cross-sectional view of a sliding unit that is applied to an active roll control device according to various embodiments of the present invention.

Referring to FIG. 2 to FIG. 4, an active roll control device according to various embodiments of the present invention varies a rigidity value of the stabilizer bar 1 depending on the driving condition of the vehicle to actively improve the roll of the vehicle.

As shown in FIG. 1, the active roll control device basically includes a stabilizer bar 1, a stabilizer link 3, a sliding unit 5 that is formed on a lower arm 7 that is a suspension arm, and a drive source 6.

Both sides of the stabilizer bar 1 is disposed on a bracket 13 of a sub frame 11 in a vehicle body side through a mounting bushing 15.

And, an upper end of the stabilizer link 3 is connected to one end of the stabilizer bar 1 through a ball joint (BJ).

Meanwhile, an outside end portion of the lower arm 7 is connected to a lower side of the knuckle 17 and forms a housing portion 21 at one side thereof to house the sliding unit 5.

Referring to FIG. 2, the sliding unit 5 includes a slide rail 23 that is disposed inside the housing portion 21 on the lower arm 7 and a connector 25 that is connected to a lower end of the stabilizer link 3 is disposed between the slide rail 23 to be guided in a vehicle width direction.

And, the drive source 6 includes a motor 19 that has a drive shaft 27 that is moved forward/reward to be disposed at one side of the sub frame 11 and the drive shaft 27 is connected to the connector 25 through the push rod 29 and pushes or draws the bushing housing 25.

Accordingly, the active roll control device having such a structure as described above adjusts a connection position of the stabilizer link 3 on the lower arm 7 through the operation of the motor 19 depending on the driving condition of the vehicle to vary the lever ratio of the stabilizer link 3 such that the roll rigidity of the vehicle is actively controlled to improve the turning stability of the vehicle.

Meanwhile, such active roll control device is disposed in a narrow space that is formed at a lower portion of the vehicle body and therefore has to a compact structure, for this, a friction resistance of the sliding unit 5 is minimized to enhance the power delivery efficiency of the motor 19 in various embodiments of the present invention such that the drive source 6 is down sized.

Hereinafter, referring to FIG. 3 and FIG. 4, the configuration of the sliding unit 5 will be described.

That is, the sliding unit 5 includes a slide rail 23, a connector 25, and a plurality of load rollers 31 and guide rollers 32.

The slide rail 23 is respectively disposed at both sides of the housing portion 21 that is formed at one side of the lower arm 7 along a vehicle width direction.

A mounting portion 24 is disposed at a front/rear side of the sliding rail 23 and is inserted into the inside of the housing portion 21 to be fixed.

The sliding rail 23 has an upper side load surface F1, a lower side load surface F2, an inner side guide surface F3 that is respectively formed at an upper surface, a lower surface, and an inside surface.

The upper side load surface F1 and the lower side load surface F2 are disposed in parallel and the guide surface F3 is perpendicular to the upper side and lower side load surface F1 and F2.

And, the connector 25 is disposed in the housing portion 21 corresponding to the both sides slide rail 23 to be connected to an end portion of the pushrod 29 that is connected to the drive shaft 27 of the motor 19 and simultaneously to a lower end portion of the stabilizer line 3 through the double ball joint (2BJ).

Also, a first mounting groove 37 is formed at an upper surface and a lower surface of the connector 25 along the length direction thereof and a second mounting groove 38 is formed at a front/rear side surface thereof.

And, the load roller 31 contacts an upper side load surface F1 and a lower side load surface F2 of the sliding rail 23 to be rotatably disposed in the first mounting groove 37 that is formed on the connector 25 along the moving direction through a roller pin 23.

In various embodiments of the present invention, the number of the roller 31 that is disposed in the first mounting groove 37 that is formed on the connector 25 is four, but it is not limited thereto, the number of the roller can be varied if necessary.

Also, the guide roller 31 contacts the guide surface F3 of the sliding rail 23 to be rotatably disposed in the second mounting groove 38 that is formed on the connector 25 through a roller pin 33.

Accordingly, when the vehicle is bumped, a vertical load is applied to the connector 25 to lift the connector, wherein the upper side load roller 31 closely contacts the load surface F1 to absorb the vertical load while rolling.

To the contrary, when the vehicle is rebounded, a vertical load is applied to the connector to have it be fallen, wherein the lower side load roller 31 closely contacts the load surface F2 to absorb the vertical load while rolling.

Also, when moment loads is transmitted thereto from various directions, the guide roller 32 closely contacts the guide surface F3 of the slide rail 23 to absorb the moment load while rolling.

Thereby, the upper side and lower side load roller 31 and the guide roller 32 effectively absorb the vertical load and the moment load from each direction such that the connector 25 smoothly slides on the slide rail 23.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. An active roll control device that uses driving torque from a drive source to move a suspension arm side connection point of a stabilizer link that connects both sides of a stabilizer bar with a suspension arm along a sliding unit such that a roll of a vehicle is actively controlled, wherein the sliding unit includes:
    a slide rail disposed at each of two sides of a housing portion formed on an upper side of the suspension arm, each said slide rail including a load surface formed at an upper surface and a lower surface thereof, and a guide surface is formed at an inner side surface;
    a connector disposed in the housing portion corresponding to the side rail and connected to a pushrod of a drive shaft of the drive source and a lower end portion of the stabilizer link through a double ball joint;
    a plurality of load rollers rotatably disposed on an upper surface and a lower surface of the connector along a moving direction through a roller pin and contacts the load surface of the sliding rail; and
    a plurality of guide rollers rotatably disposed on a front and rear side surface of the connector through a roller pin and contacts the guide surface of the sliding rail.

2. The active roll control device of claim 1, wherein an upper side surface and a lower side surface of the load surface are respectively perpendicular to the guide surface.

3. The active roll control device of claim 1, wherein a first mounting groove that the plurality of load rollers are disposed in is formed at the upper surface and the lower surface of the connector corresponding to the upper side surface and the lower side surface of the slide rail along a length direction.

4. The active roll control device of claim 1, wherein a second mounting groove in which the plurality of guide rollers are disposed in is formed at the front and rear side surface of the connector corresponding to the guide surface of the slide rail.

5. The active roll control device of claim 1, wherein the suspension arm is a lower arm that connects a knuckle with a sub frame.

* * * * *